May 22, 1956    R. N. ZIMMERMAN    2,747,042
ENGINE LOW OIL INDICATOR
Filed Oct. 1, 1952

INVENTOR.
Robert N. Zimmerman
BY Victor J. Evans & Co.
ATTORNEYS

United States Patent Office 2,747,042
Patented May 22, 1956

2,747,042

ENGINE LOW OIL INDICATOR

Robert N. Zimmerman, Tucson, Ariz.

Application October 1, 1952, Serial No. 312,429

2 Claims. (Cl. 200—81.9)

This invention relates to safety devices used particularly with internal combustion engines, and in particular the combination of pipe fittings with a spring actuated ball therein whereby the ball is urged against a contact with a spring when the engine is in-operative or when the oil is too low, and wherein the flow of oil with the engine running pulls the ball away from the contact against the pressure of the spring whereby a warning light shows when the engine is in-operative and when the oil is low and does not show when oil is flowing through the system with the engine operating.

The purpose of this invention is to provide a device that shows a warning light when the level of oil in an internal combustion engine is below the level required for operating the engine successfully.

Various types of devices have been provided for indicating the oil level of internal combustion engines and whereas such devices operate successfully when actuated manually the usual device does not flash a warning light when the oil approaches a dangerously low level. With this thought in mind this invention contemplates a fitting having a contact therein wherein with the fitting connected in the oil circulating system of the engine contacting elements are retained separated with the oil flowing through the system and are released to form a contact when the oil is too low to be circulated through the system.

The object of this invention is, therefore, to provide an oil level warning device that operates continuously and does not require a manual control.

Another object of the invention is to provide a low oil indicating device that may readily be installed on motor vehicles now in use.

A further object of the invention is to provide a low oil warning device which is of a simple and economical construction.

With these and other objects and advantages in view the invention embodies a fitting, such as a T, having an inlet connection at one end with an outlet connection extended from the opposite end and with an insulated contact member mounted in a side connection and positioned to be engaged by a spring actuated ball in a bushing in the said outlet connection.

Other features and advantages of the invention will appear from the following description taken in connection with the drawing, wherein.

Figure 1:
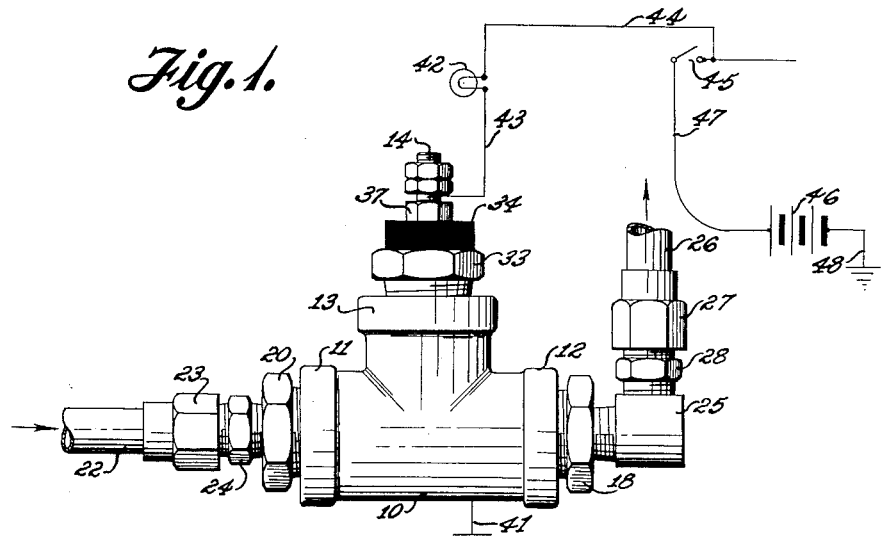
Figure 1 is a side elevational view showing the fuel oil level indicating fitting with the parts assembled and with a light circuit diagram shown in combination therewith.

Referring now to the drawing wherein like reference characters denote corresponding parts the improved low oil indicator of this invention includes a casing 10, in the form of a T, having an inlet connection 11, an outlet connection 12, and a side connection 13, with a screw 14 positioned in and insulated from the side connection and having a nipple 15 threaded on the lower end. The nipple 15 is positioned to contact a ball 16 in a bushing 17 in the outlet connection 12 and the bushing is threaded in a nut 18 having a threaded sleeve 19 which extends into the outlet connection of the fitting.

The inlet connection 11 of the fitting or casing 10 is provided with a nut 20 having a threaded sleeve 21 and a supply tube 22 is connected to the nut 20 with a coupling 23 and a nipple 24.

The nut 18 in the outlet connection of the fitting is provided with an elbow 25 from which a tube 26 extends, the tube being connected with a coupling 27 and a nipple 28.

The ball 16 is freely mounted in the bushing 17 and a spring 29 urges the ball outwardly of the bushing whereby the ball engages the lower edge of the nipple 15 when the oil pump of the engine is inoperative or when the flow of oil through the device is insufficient to move the ball against the spring. One end of the spring is seated in a counterbore or recess 30 in the fitting 25 and the opposite end is secured to a floating collar 31 which engages the ball.

Figure 2:
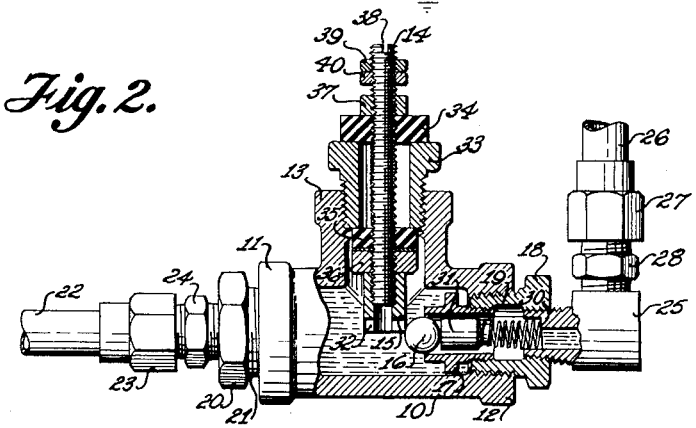
Figure 2 is a side elevational view, similar to that shown in Figure 1, with parts broken away and other parts shown in section, said section being taken substantially on the longitudinal center of the fitting.
Figure 3:
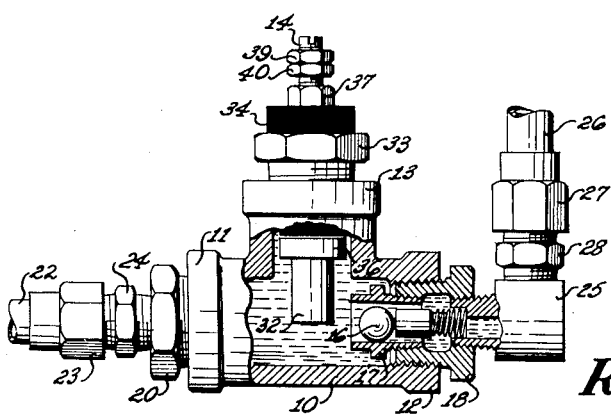
Figure 3 is a view similar to that shown in Figure 2 illustrating the parts of the device in their respective positions with oil flowing through the fitting wherein a contact ball therein is spaced from a contact positioned in the fitting.

The nipple 15, the lower end of which is provided with a screw driver slot 32, is threaded on the lower end of the screw 14 and, as illustrated in Figure 2, the screw is mounted in a nut 33 with washers 34 and 35 of insulating material, separating the screw from the nut. The lower end of the screw is provided with a lock nut 36 and a similar nut 37 is positioned to engage the washer 34 whereby the washers are clamped by the lock nuts against the ends of the nut 33. The outer end of the screw 14 is provided with a screw driver slot 38, and terminal holding nuts 39 and 40 are provided on the screw.

With the fitting or casing 10 grounded as indicated at the point 41 a circuit may be completed to a warning light 42 with one end of a wire 43 secured by the nuts 39 and 40 on the end of the screw 14 and the other connected by a wire 44 to a switch 45, which may be the ignition switch of a motor vehicle. From the switch 45, the circuit is connected to a battery 46 by a wire 47 with the opposite terminal of the battery grounded as indicated by the numeral 48.

With the parts formed in this manner the light 42, which may be red, will light as the ignition switch is turned on and as the engine upon which the device is mounted, with its oil pump, is started the flow of oil, circulating in the direction of the arrows shown in Figure 1, moves the ball 16 into the bushing 17 separating the ball from the nipple 32 and breaking the contact through the device. By this means a warning night will show when the device is in operation and also when the device is operating with insufficient oil in the system, and the circuit to the light will be broken with the device operating with the normal supply of oil in the system.

It will be understood that modifications, within the scope of the appended claims, may be made in the design and arrangement of parts without departing from the spirit of the invention.

What is claimed is:

1. In a low oil indicator the combination which comprises a fitting having aligned inlet and outlet connections and a side connection positioned between the inlet and outlet connections, means connecting tubes to said inlet and outlet connections, a coupling connected to said side connection, a screw having a nipple on the inner end loosely extended through the coupling connected to said side connection, washers of insulating material mounted on said screw to insulate said screw from said side connection, lock nuts on said screw outwardly of said washers engaging said washers to firmly retain the washers in contact with said coupling and the screw spaced from said coupling, a bushing extended into said outlet connection, a ball freely mounted in said bushing, a spring positioned in the bushing for urging the ball outwardly of the bushing, said bushing positioned whereby in an outwardly extended position the ball contacts the nipple of the screw extended through the coupling connected to the side connection.

2. In a low oil indicator the combination which comprises a fitting having aligned inlet and outlet connections and a side connection positioned between the inlet and outlet connections, means connecting tubes to said inlet and outlet connections, a coupling connected to said side connection, a screw having a nipple on the inner end loosely extended through the coupling connected to said side connection, washers of insulating material mounted on said screw to insulate said screw from said side connection, lock nuts on said screw outwardly of said washers engaging said washers to firmly retain the washers in contact with said coupling and the screw spaced from said coupling, a bushing extended into said outlet connection, a ball freely mounted in said bushing, a spring positioned in the bushing, a floating collar connected to one end of the spring and engaging the ball, for urging the ball outwardly of the bushing, said bushing positioned whereby in an outwardly extended position the ball contacts the nipple of the screw extended through the coupling connected to the side connection, and means adjusting the position of the nipple carried by the screw extended through said side connection.

References Cited in the file of this patent

UNITED STATES PATENTS

| | | |
|---|---|---|
| 782,703 | Schopbach | Feb. 14, 1905 |
| 808,929 | Kettering | Jan. 2, 1906 |
| 1,280,222 | Hester | Oct. 1, 1918 |
| 1,347,019 | Edwards | July 20, 1920 |
| 1,469,106 | Phillips | Sept. 25, 1923 |
| 1,582,154 | Zeiher et al. | Apr. 27, 1926 |
| 1,775,773 | McGuire | Sept. 16, 1930 |
| 2,529,775 | Maddox | Nov. 14, 1950 |

FOREIGN PATENTS

| | | |
|---|---|---|
| 891,304 | France | Dec. 11, 1943 |